US007200557B2

(12) United States Patent

Droppo et al.

(10) Patent No.: US 7,200,557 B2

(45) Date of Patent: Apr. 3, 2007

(54) METHOD OF REDUCING INDEX SIZES USED TO REPRESENT SPECTRAL CONTENT VECTORS

(75) Inventors: James G. Droppo, Duvall, WA (US); Alejandro Acero, Bellevue, WA (US); Constantinos Boulis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 948 days.

(21) Appl. No.: 10/306,367

(22) Filed: Nov. 27, 2002

(65) Prior Publication Data

US 2004/0102972 A1 May 27, 2004

(51) Int. Cl.
*G10L 15/00* (2006.01)

(52) U.S. Cl. ........................ 704/242; 704/219; 704/262

(58) Field of Classification Search ................ 704/242, 704/219, 262

See application file for complete search history.

(56) References Cited

U.S. PATENT DOCUMENTS

| | | | | |
|---|---|---|---|---|
| 5,715,367 | A * | 2/1998 | Gillick et al. | 704/254 |
| 6,018,706 | A * | 1/2000 | Huang et al. | 704/207 |
| 6,260,016 | B1 * | 7/2001 | Holm et al. | 704/260 |
| 6,711,541 | B1 * | 3/2004 | Kuhn et al. | 704/242 |
| 6,728,672 | B1 * | 4/2004 | Will | 704/233 |
| 2004/0088163 | A1 * | 5/2004 | Schalkwyk | 704/251 |

* cited by examiner

*Primary Examiner*—David Hudspeth
*Assistant Examiner*—Jakieda R. Jackson
(74) *Attorney, Agent, or Firm*—Theodore M. Magee; Westman, Champlin & Kelly, P.A.

(57) ABSTRACT

A method identifies a codeword to represent a vector derived from an audio signal by applying the vector to first and second decision trees. The first decision tree is associated with a first type of audio sound and produces a first codeword. The second decision tree is associated with a second type of audio sound and produces a second codeword. One of the first and second codewords is then selected as the codeword for the vector. In further embodiments, the vector describes the spectral content of the audio signal and a linear prediction value is generated for the vector. The difference between the linear prediction value and the vector is used to identify the codeword.

29 Claims, 6 Drawing Sheets

METHOD OF REDUCING INDEX SIZES USED TO REPRESENT SPECTRAL CONTENT VECTORS

BACKGROUND OF THE INVENTION

The present invention relates to representations of the spectrum of a signal. In particular, the present invention relates to reducing the size of data words needed to describe the spectral content of a signal.

In speech recognition, the speech signal is typically divided into frames and each frame is converted into a set of values that describe the spectral energy of the frame. These spectral values are then used to decode the speech signal to produce a sequence of words.

At times, it is desirable to transmit the spectral values from one computer to another to allow for distributed recognition of the speech signal or to store the spectral values for later processing. One barrier to transmitting or storing these values is that for each frame there are often at least thirteen spectral values and each spectral value is represented by a sixteen bit word. This results in 26 bytes per frame. With a new frame being constructed every ten milliseconds, 2.6 kilobytes of information must be transmitted for every second of speech.

To reduce the amount of information that must be transmitted or stored, the prior art has used Vector Quantization in which each combination of spectral values that can be generated for a frame is represented by a codeword in a codebook. The index for the codeword is then transmitted or stored in place of the spectral values. At the receiver or when the index is retrieved for processing, the index is applied to a copy of the codebook to retrieve the codeword. The codeword is then used as the spectral vector.

Although Vector Quantization reduces the amount of data that must be transmitted or stored, it requires a large amount of memory to store all of the codewords. In fact, the codebook for the spectral values typically exceeds the amount of memory available on the computing device.

To overcome this, split-Vector Quantization has been used. In split-Vector Quantization, the spectral vector is divided into segments and a codeword is identified for each segment of the vector. For example, for a spectral vector of [C0,C1,C2,C3,C4,C5,C6,C7,C8,C9,C10,C11,C12], C0 would constitute one segment, [C1,C2,C3,C4,C5,C6] would constitute a second segment, and [C7,C8,C9,C10,C11,C12] would constitute a third segment. Thus, three codewords would be used to describe each frame. Although more codewords are used at each frame, the number of possible codewords drops significantly using split-Vector Quantization such that the size of the indices is greatly reduced.

However, even with the techniques provided by split-Vector Quantization, additional reductions in the amount of data transmitted or stored for a spectral representation of a speech signal is desired.

SUMMARY OF THE INVENTION

A method identifies a codeword to represent a vector derived from an audio signal by applying the vector to first and second decision trees. The first decision tree is associated with a first type of audio sound and produces a first codeword. The second decision tree is associated with a second type of audio sound and produces a second codeword. One of the first and second codewords is then selected as the codeword for the vector. In further embodiments, the vector describes the spectral content of the audio signal and a linear prediction value is generated for the vector. The difference between the linear prediction value and the vector is used to identify the codeword.

DETAILED DESCRIPTION OF ILLUSTRATIVE EMBODIMENTS

Figure 1:
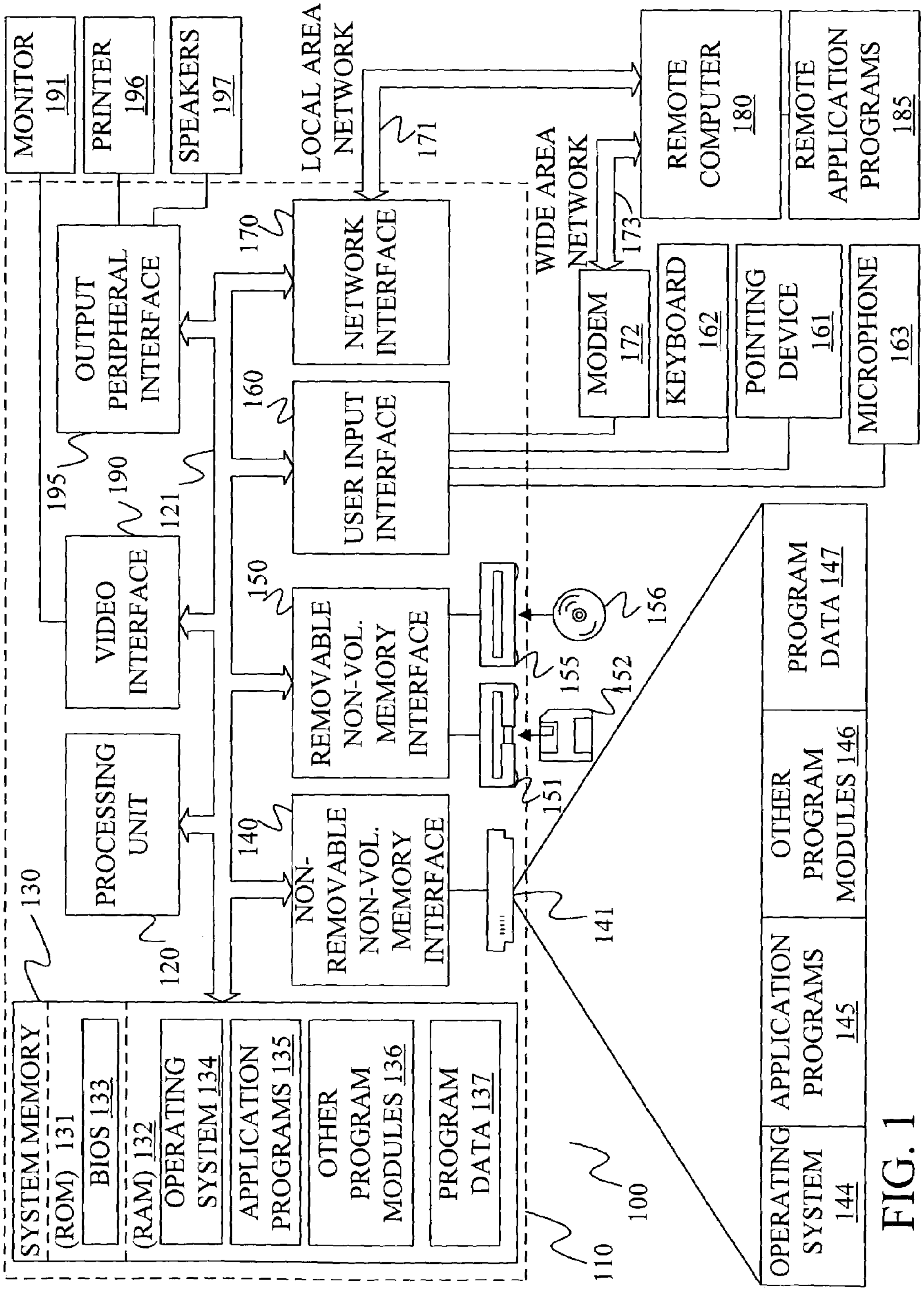
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term “modulated data signal” means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
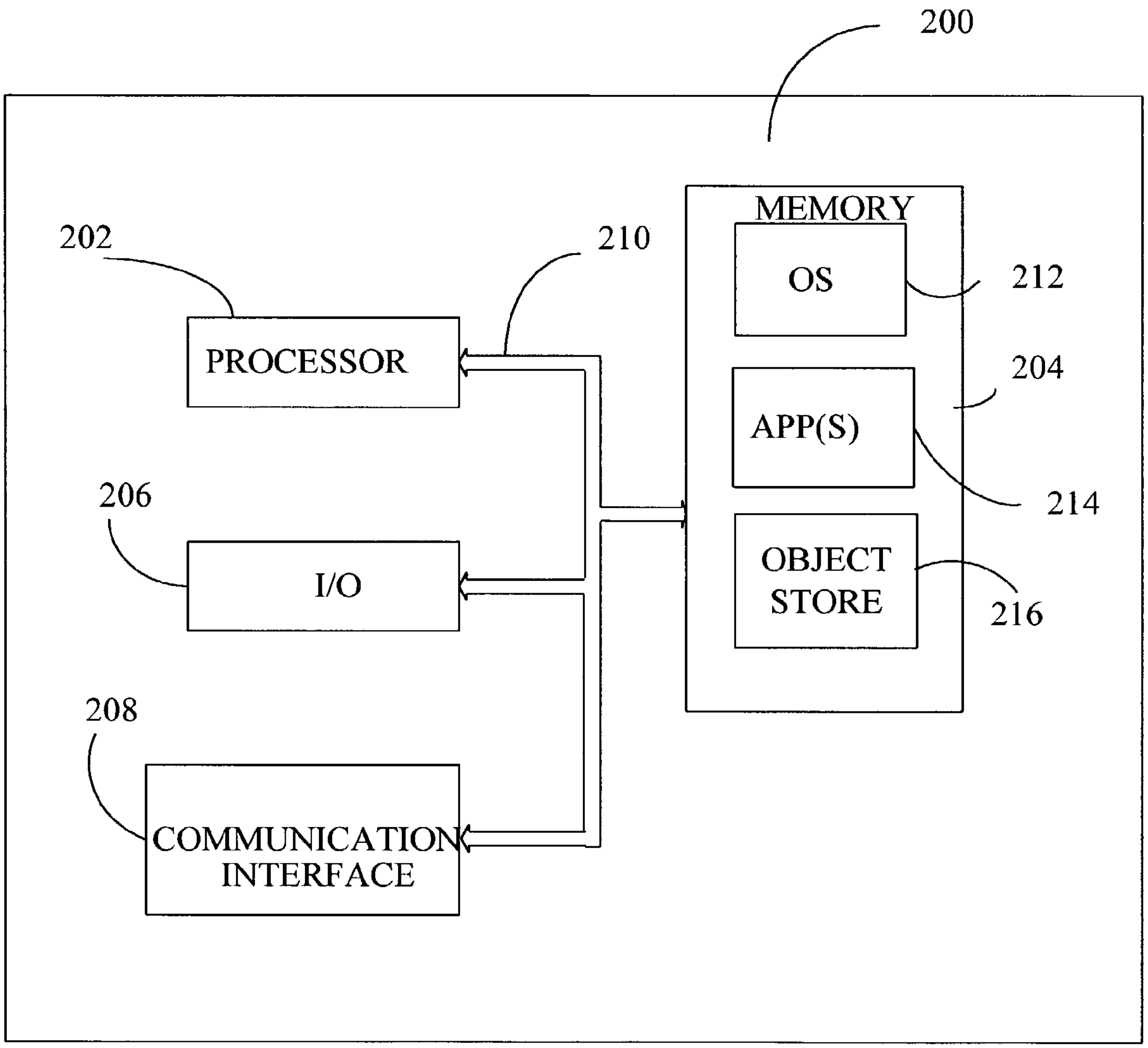
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information. Through communication interface 208, mobile device 200 may be connected to a remote server, personal computer, or network node. Under the present invention, mobile device 200 is capable of transmitting speech data from the mobile device to a remote computer where it can be decoded to identify a sequence of words.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

The present invention provides a means for transmitting and/or storing spectral information that describes a speech signal so that a smaller amount of data is transmitted or stored.

Figure 3:
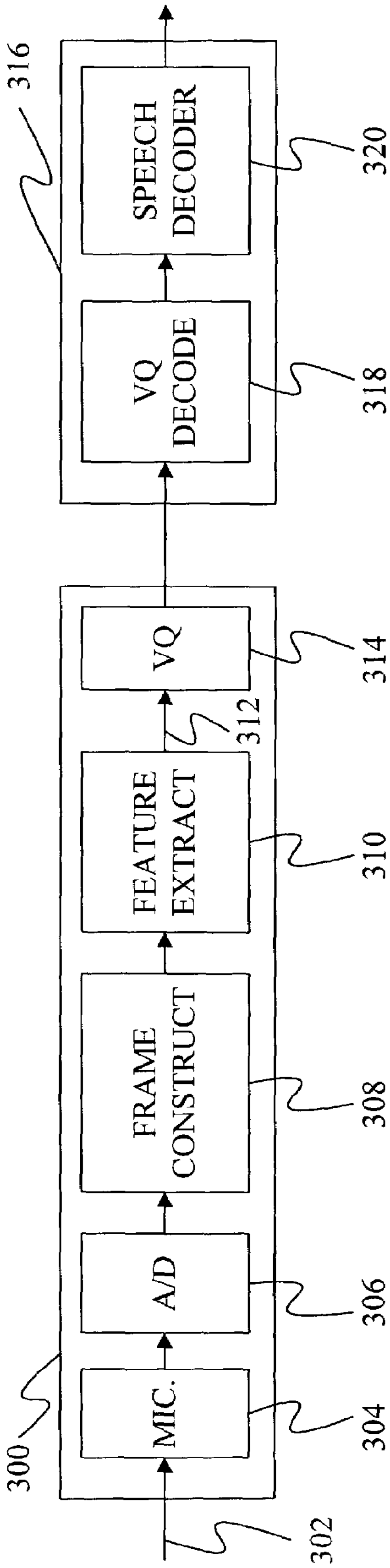
FIG. 3 is a block diagram of a client-server system under one embodiment of the present invention.

FIG. 3 shows a block diagram of a local-remote computer system in which embodiments of the present invention may be practiced. In FIG. 3, a local device 300, which can be a computer such as computer 110 described above or a mobile device such as mobile device 200, receives a speech signal 302 at a microphone 304. The audio waves of the speech are converted into analog electrical signals by microphone 304. An analog-to-digital converter 306 then converts the analog signal into a sequence of digital values, which are grouped into frames of values by a frame constructor 308. In one embodiment, A-to-D converter 306 samples the analog signal at 16 kHz and 16 bits per sample, thereby creating 32 kilobytes of speech data per second and frame constructor 308 creates a new frame every 10 milliseconds that includes 25 milliseconds worth of data.

Each frame of data provided by frame constructor 308 is converted into a feature vector by a feature extractor 310. Methods for identifying such feature vectors are well known in the art and include 13-dimensional Mel-Frequency Cepstrum Coefficients (MFCC) extraction, which produces 13 cepstral values per feature vector. The cepstral feature vector represents the spectral content of the speech signal within the corresponding frame.

The feature vectors 312 generated by feature extractor 310 are provided to a Vector Quantization (VQ) unit 314, which identifies a set of codewords to represent the vectors. The inventive technique for identifying these codewords is described below.

After the codewords have been identified by VQ 314, indices for the codewords are transmitted to a remote computer 316 over a communication path that can include wire or wireless connections through one or more network nodes. In remote computer 316, the indices are applied to a codebook by a VQ decoder 318 to retrieve the corresponding codewords. These codewords are then provided to a speech decoder 320, which uses the codewords to identify words represented by the speech signal.

Note that although FIG. 3 depicts the local device as transmitting the indices to a remote computer where they are used to perform speech decoding, in other embodiments, the local device stores the indices in a local memory and retrieves them at a later time. Upon retrieval, the indices are used to identify the corresponding codewords and the retrieved codewords are used in speech decoding.

Figure 4:
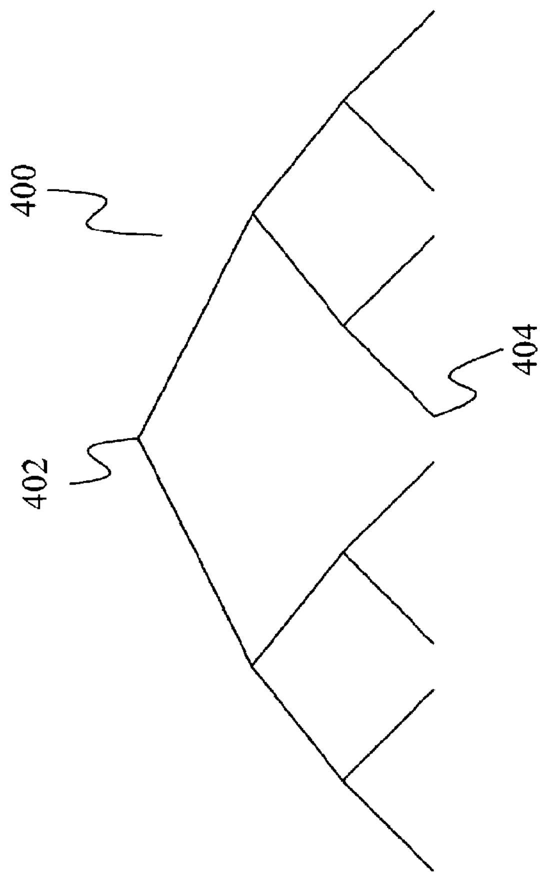
FIG. 4 is an example of a prior art decision tree.

In the past, Vector Quantization was performed by applying the feature vector, or some segment of the vector, to a decision tree, such as decision tree 400 of FIG. 4. The tree is traversed in a top-down manner and at each node in the tree a question is applied to the segment of the feature vector. Based on the answer to the question, one of the child nodes of the current node is selected. The question at that node is then applied to the segment of the vector. Eventually a leaf node is reached, which contains the codeword index to be assigned to the segment of the feature vector. For example, beginning at node 402, the decision tree could be traversed until reaching leaf node 404, which contains a codeword index.

Under the prior art, only one decision tree was provided for each segment of the feature vector. Thus, if a 13-dimensional vector composed of values C0–C12 were divided into three segments containing values C0, C1–C6, and C7–C12, respectively, there would be only three decision trees, one for each segment.

Under an embodiment of the present invention, multiple decision trees are provided for each segment. Each decision tree is trained by grouping training feature vectors for similar types of audio sounds. As a result, each tree has a smaller range of possible feature vectors and these vectors can be represented by a smaller number of codewords. This results in fewer bits in the index used to identify the codewords.

Figure 5:
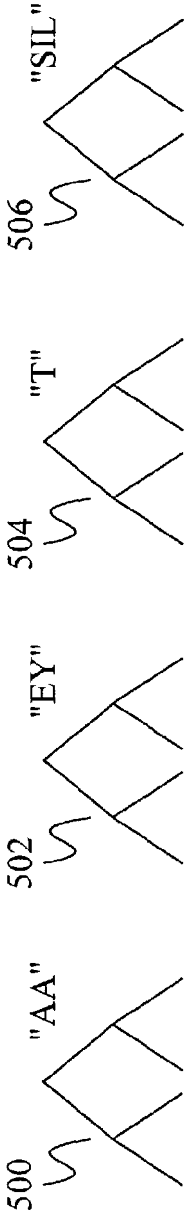
FIG. 5 shows a set of decision trees under the present invention.

For example, under one embodiment, a separate decision tree is provided for each phone in a language, including the silence phone. Thus, as shown in FIG. 5, there are separate decision trees 500, 502, 504, and 506 for the phones “AA”, “EY”, “T” and “Silence”.

Note there are more phones in most languages and thus there would be more decision trees. Only a small number of the possible phones are shown in FIG. 5 for simplicity. In addition, the sizes of the decision trees can be different for different phones and the present invention is not limited to the particular tree sizes shown. Furthermore, binary decision trees do not have to be used and each node can have any number of desired children. In other embodiments, audio sounds are grouped into types based on whether they are a vowel sound or a consonant.

To train each tree, feature vectors are generated from a known text and the feature vectors associated with each phone are grouped together. Thus, all of the feature vectors for the phone "AA" would be grouped together. A decision tree is then constructed based on the group of training vectors for the phone. The construction of such decision trees is well known and involves selecting questions that divide the training data to optimize some goodness measure. Typically, the goodness measure divides the vectors such that the resulting groups or classes formed by the division are clearly discriminated between each other. The particular technique used for selecting the question sets is not critical to the present invention and any technique that results in a reasonable decision tree may be used.

Under many embodiments, split Vector Quantization is performed where several decision trees are formed for each phone with each tree being assigned to a different segment of the feature vector. For example, under one embodiment three decision trees are formed for each phone with one tree for vector value C0, one tree for vector segment C1–C6 and one tree for vector segment C7–C12. These trees are trained in the same manner as described above except that only the segment of the vector that is associated with the tree is used during training.

Figure 6:
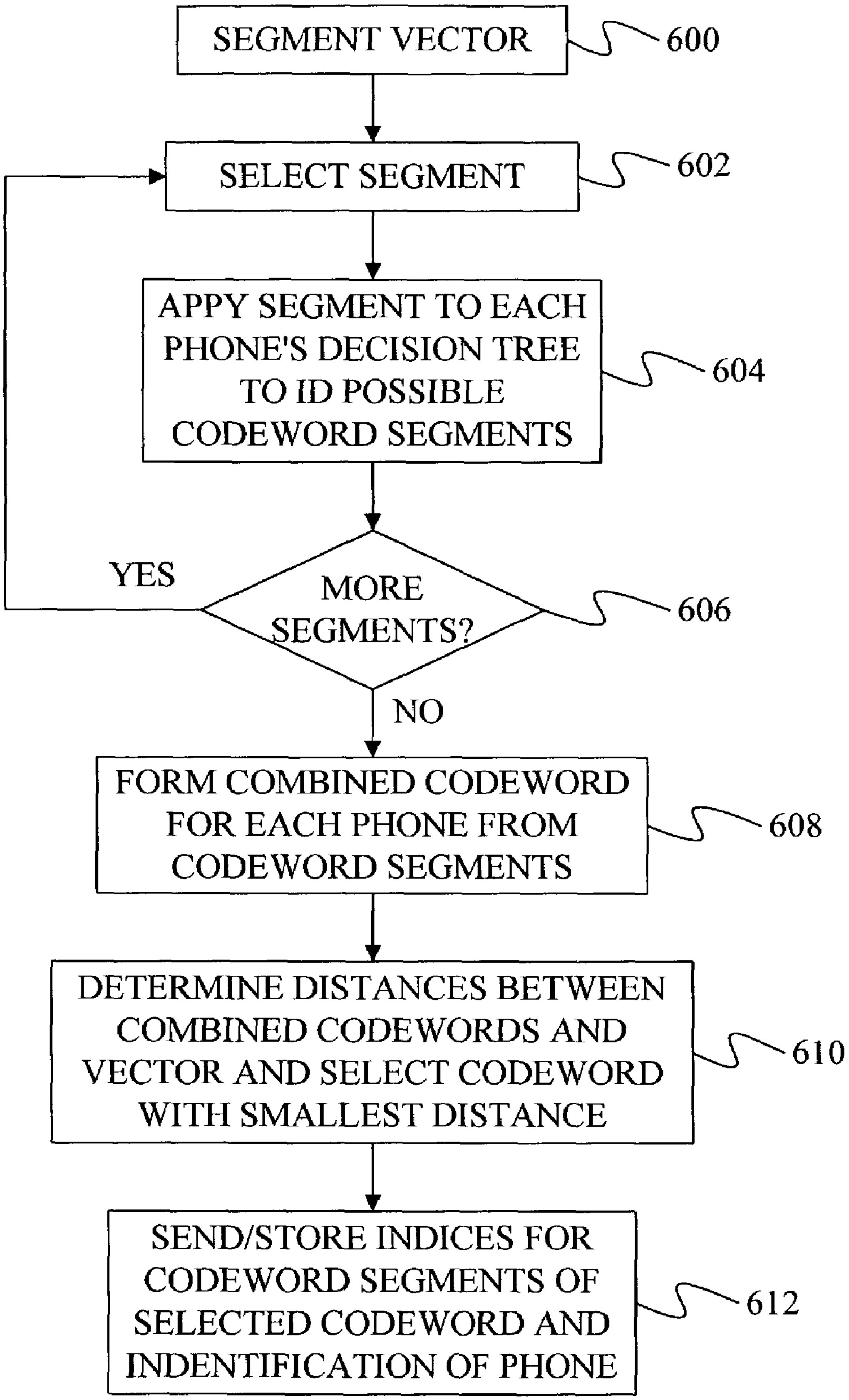
FIG. 6 provides a flow diagram of a method of converting speech into codeword indices under some embodiments of the present invention.

Once the decision trees have been constructed, they can be used to identify codewords for an input feature vector. FIG. 6 provides a flow diagram for one method of selecting codewords for an input vector. At step 600, the vector is divided into segments, if desired, so that split vector quantization can be performed. At step 602, one of the segments is selected. The selected segment is applied to each phone's decision tree at step 604 to identify a possible codeword segment by traversing the tree from the top of the tree to a leaf node.

After a possible codeword segment has been identified for each phone, the method determines if there are additional segments of the vector to process at step 606. If there are, the process returns to step 602 where the next segment is selected. The new segment is then applied to the decision trees associated with that segment. In particular, the new segment is applied to a separate decision tree for each phone.

When all of the segments of the vector have been processed at step 606, a combined codeword is formed for each phone at step 608 by combining the codeword segments produced for each phone in step 604. Thus, if codeword segments W0, [W1,W2,W3,W4,W5,W6], and [W7,W8,W9,W10,W11,W12] had been formed for the phone "AA", step 608 would combine them to form a codeword of [W0,W1,W2,W3,W4,W5,W6,W7,W8,W9,W10,W11,W12].

At step 610, the distance between each phone's combined codeword and the feature vector is determined. The combined codeword that is the closest to the vector is then selected as the codeword for the vector. At step 612, the indices for the codeword segments that form the selected codeword, together with an identifier that indicates which phone generated the codeword, are transmitted to a remote computer or stored for later use.

Using the stored or transmitted indices, it is possible to retrieve the codeword segments by applying the indices to the codebooks associated with the phone used to form the indices. The retrieved segments can then be combined to form a codeword that is used in decoding.

In other embodiments, different segments of the codeword can come from decision trees associated with different phones. Thus, instead of all of the segments being associated with a single phone, one segment can come from a decision tree associated with a first phone while a different segment can come from a decision tree associated with a second phone. In such embodiments, all of the possible combinations of codeword segments formed from the decision trees for the phones are compared to the feature vector to determine which combination is closest to the feature vector. The transmitted data then consists of a phone label and an index for each segment in the closest combination. For example, the data would include [phone1,N1,phone2,N2,phone3,N3], where phone1, phone2, and phone3 are the phones identified for the first, second and third segment of the codeword, and N1, N2, and N3 are the indices for the respective codeword segments.

Note that in this second embodiment, more data is transmitted. As a result, to maintain efficiency, the decision trees need to shrink to provide a comparable data rate.

In a further embodiment of the present invention, the amount of data that is transmitted or stored is further reduced by utilizing linear predictive coding. As shown in the block diagram of FIG. 7, under this embodiment of the invention, a client 700 receives a speech signal at a microphone 702, converts the signal into a digital signal using an analog-to-digital convertor 704, groups the digital values into frames using a frame constructor 706 and extracts feature vectors that describe the spectral content of a frame using a feature extractor 708 in the same manner as described above for FIG. 3. In particular, the feature vector is based on a frequency-domain representation of the audio signal. Thus the vector contains spectral values or cepstral values.

Figure 7:
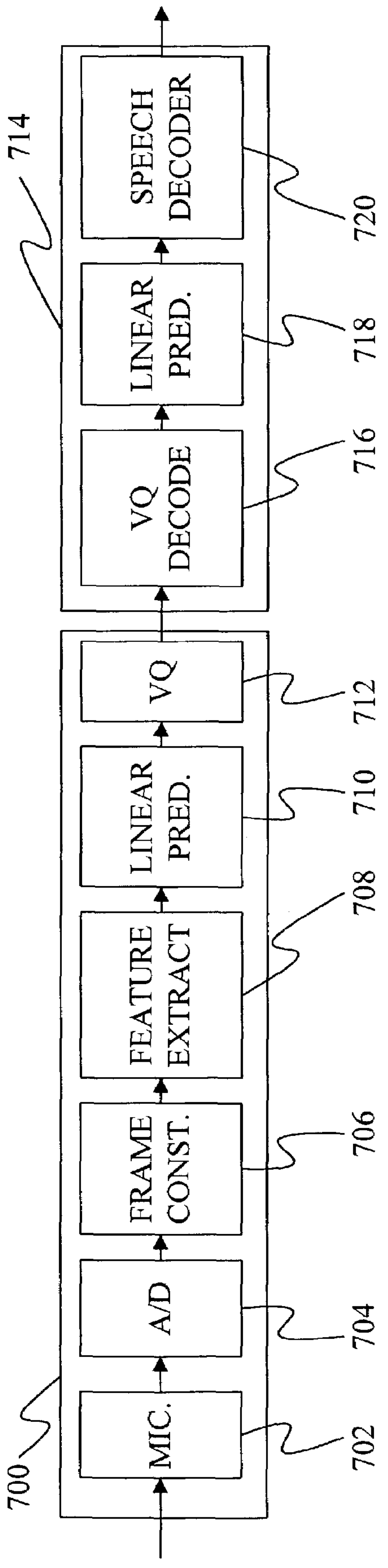
FIG. 7 is a block diagram of an additional embodiment of the present invention.

In the embodiment of FIG. 7, the vectors are not used directly to select the codewords. Instead, the vectors are provided to a linear prediction unit 710.

Figure 8:
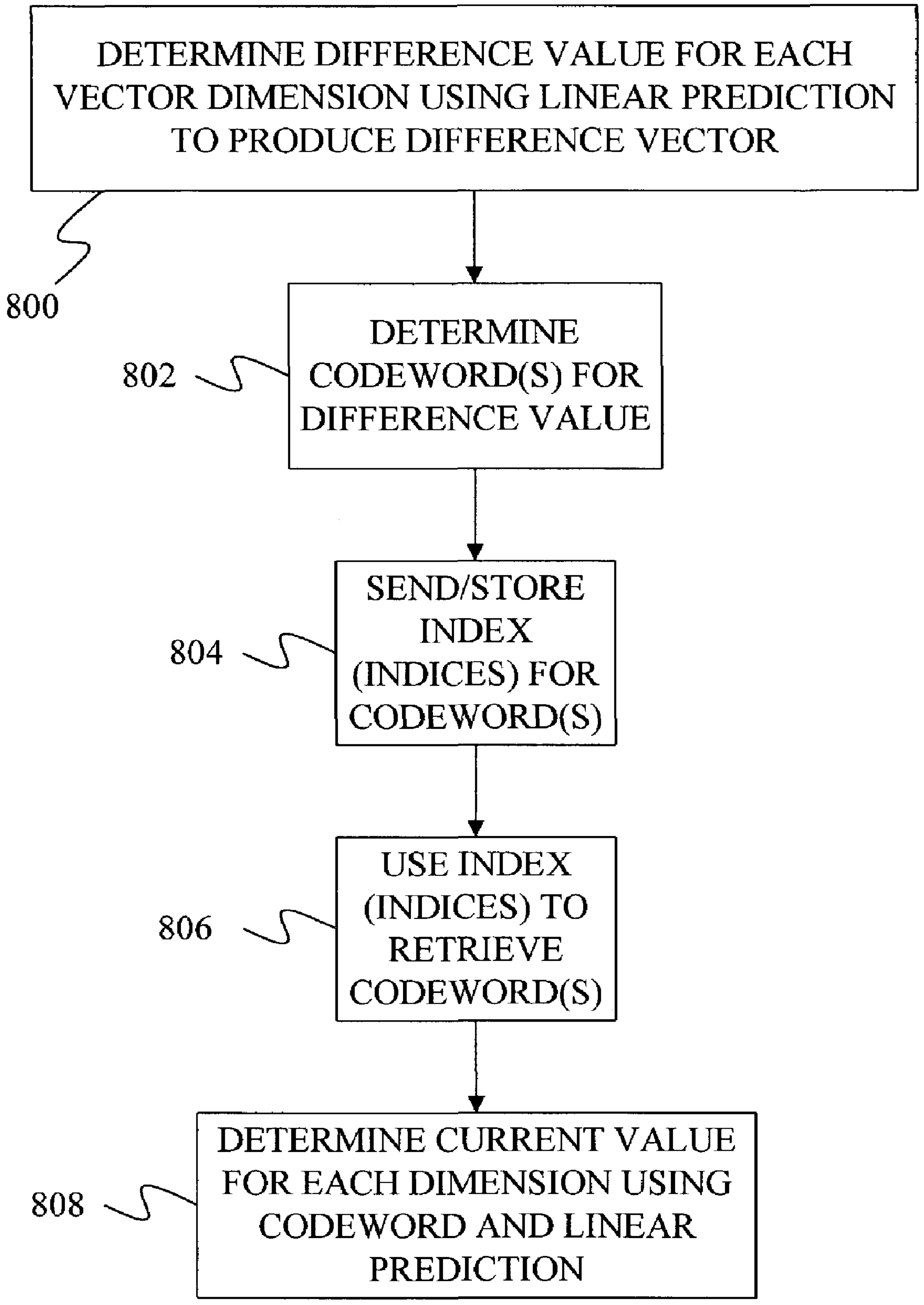
FIG. 8 is a flow diagram of a method of using linear prediction under the present invention.

As shown in step 800 of the flow diagram of FIG. 8, linear prediction unit 710 converts the vector into a difference vector, which is equal to the difference between the vector and a vector generated through linear prediction based on past vectors. In particular, linear prediction unit 710 generates a difference value for each dimension of the vector through the equation:

$$\Delta x = x_t - \sum_{\tau=1}^{N} \alpha_\tau x_{t-\tau} \quad \text{EQ. 1}$$

where $\Delta x$ is the difference value, $x_t$ is a dimension of the vector for the current time t, $x_{t-\tau}$ is a dimension of the vector for a previous time $t-\tau$, $\alpha_\tau$ is a linear prediction coefficient, and N is the number of previous vectors that are used to predict the next vector.

At step 802, the difference values for the dimensions of the vector are provide to vector quantization unit 712, which identifies a codeword for the difference values. This can be done using a single decision tree or using a separate decision tree for each phone as discussed above. In addition, all of the difference values can be applied to the same decision trees or the difference values can be grouped into segments, with each segment being applied to the decision trees separately to thereby perform split vector quantization.

At step 804, the index or indices for the identified codewords are passed to a remote computer 714 (or stored in other embodiments. The index or indices are then used by a VQ decoder 716 to retrieve the codewords represented by the index or indices at step 806. These codewords are provided to a linear prediction unit 718, which identifies a current value for each dimension at step 808 using the equation:

$$x_t = \Delta x_{codeword} + \sum_{\tau=1}^{N} \alpha_\tau x_{t-\tau} \qquad \text{EQ. 2}$$

where $x_t$ is a value for a dimension of the vector for the current time t, $\Delta x_{codeword}$ is the difference value for the dimension retrieved from codebooks 716, $x_{t-\tau}$ is the value of the dimension at a previous time t−τ, $\alpha_{96}$ is a linear prediction coefficient, and N is the number of previous vectors that are used to predict the next vector. Note that linear prediction units 710 and 718 use the same linear prediction coefficients and the same value of N.

Equation 2 is used for each dimension resulting in a reconstructed vector that is provided to a decoder 720. Decoder 720 uses a sequence of retrieved in the same way as described above to identify a sequence of words represented by the speech signal.

Since the difference values have a smaller range of possible values, they can be described with fewer bits, resulting in fewer codewords in the codebooks. As a result, the indices passed to the remote computer are smaller using the linear prediction technique of FIGS. 7 and 8.

Although the present invention has been described with reference to particular embodiments, workers skilled in the art will recognize that changes may be made in form and detail without departing from the spirit and scope of the invention.

What is claimed is:

1. A method of identifying a codeword to represent a vector derived from an audio signal, the method comprising:
- applying the vector to a first decision tree associated with a first type of audio to produce a first codeword;
- applying the vector to a second decision tree associated with a second type of audio to produce a second codeword; and
- selecting one of the first codeword and the second codeword to represent the vector.

2. The method of claim 1 wherein the first type of audio is a vowel sound and the second type of audio is a consonant sound.

3. The method of claim 1 wherein the first type of audio is a first phone and the second type of audio is a second phone.

4. The method of claim 1 wherein the first decision tree is trained using vectors only associated with the first type of audio.

5. The method of claim 1 wherein selecting one of the first codeword and the second codeword comprises:
- determining the distance between the first codeword and the vector;
- determining the distance between the second codeword and the vector;
- selecting the codeword with the smallest distance to the vector.

6. The method of claim 1 further comprising transmitting a value that identifies the codeword to a remote device.

7. The method of claim 6 where in transmitting comprises transmitting a value that identifies the type of audio associated with the selected codeword.

8. The method of claim 1 wherein the vector is a cepstral vector.

9. The method of claim 1 wherein the vector is a difference vector representing the difference between a cepstral vector generated from the audio signal and a predicted cepstral vector generated using linear prediction.

10. The method of claim 1 further comprising dividing the vector into a first segment and a second segment and wherein applying the vector to a first decision tree and applying the vector to a second decision tree comprises applying the first segment to the first decision tree to produce a first codeword segment and applying the first segment to the second decision tree to produce a second codeword segment.

11. The method of claim 1 further comprising applying the vector to a separate decision tree for each phone in a language to produce a separate codeword for each phone.

12. A computer-readable medium having computer-executable instructions for performing steps comprising:
- identifying a first codeword found in a first codebook associated with a first type of audio based on a vector representing an audio signal;
- identifying a second codeword found in a second codebook associated with a second type of audio based on the vector, the second codebook being separate from the first codebook; and
- selecting one of the first codeword and the second codeword to represent the vector.

13. The computer-readable medium of claim 12 wherein the vector is a cepstral vector.

14. The computer-readable medium of claim 12 wherein identifying a first codeword comprises:
- determining a linear prediction value for the vector;
- determining a difference between the linear prediction value and the vector; and
- selecting the codeword based on the difference.

15. The computer-readable medium of claim 12 wherein the first type of audio is a first speech phone and the second type of audio is a second speech phone.

16. The computer-readable medium of claim 12 wherein identifying a first codeword comprises identifying a segment of a first codeword and wherein identifying a second codeword comprises identifying a segment of the second codeword.

17. The computer-readable medium of claim 16 wherein identifying a segment of the first codeword comprises identifying the segment based on a segment of the vector.

18. The computer-readable medium of claim 12 further comprising transmitting an identifier of the selected codeword and an identifier of the type of audio associated with the selected codeword to a remote device.

19. A method of compressing an audio signal, the method comprising:
- generating a vector based on a frequency-domain representation of a frame of the audio signal;
- determining a linear prediction value for a dimension of the vector the linear prediction value comprising a sum of previous values for the dimension;
- determining the difference between the linear prediction value and the dimension of the vector;
- identifying a codeword index based on the difference; and
- using the index as a compressed form of the frame of the audio signal.

20. The method of claim 19 wherein identifying a codeword index comprises:

identifying a first codeword index associated with a first type of audio signal;

identifying a second codeword index associated with a second type of audio signal; and selecting one of the first codeword index or the second codeword index as the index.

21. The method of claim 20 wherein the first type of audio comprises a first speech phone and the second type of audio comprises a second speech phone.

22. The method of claim 20 wherein the compressed form of the frame further comprises the type of audio associated with the index.

23. The method of claim 20 wherein generating a vector comprises generating a cepstral vector.

24. A computer-readable medium having computer-executable instructions for performing steps comprising:

identifying a cepstral vector to represent a frame of a signal;

applying a model to cepstral vectors for previous frames of the signal to generate a predicted value for the cepstral vector;

subtracting the cepstral vector from the predicted value to generate a difference value; and using the difference value to represent the cepstral vector.

25. The computer-readable medium of claim 24 wherein using the difference value to represent the cepstral vector comprises using the difference value to select a codeword to represent the cepstral vector.

26. The computer-readable medium of claim 25 wherein using the difference value to represent the cepstral vector further comprises after selecting the codeword using the index of the codeword to represent the cepstral vector.

27. The computer-readable medium of claim 25 wherein using the difference value to select a codeword comprises:

applying the difference value to a first decision tree associated with a first type of audio to generate a first codeword;

applying the difference value to a second decision tree associated with a second type of audio to generate a second codeword; and selecting one of the first codeword and the second codeword as the codeword for the cepstral vector.

28. The computer-readable medium of claim 27 wherein the first type of audio is a first phone and the second type of audio is a second phone.

29. The computer-readable medium of claim 27 further comprising applying the difference value to a separate decision tree for each phone in a language to generate a separate codeword for each phone and selecting one of the codewords as the codeword for the cepstral vector.

* * * * *